United States Patent
Pardhy et al.

(10) Patent No.: US 8,473,601 B2
(45) Date of Patent: Jun. 25, 2013

(54) MULTIPLE PING MANAGEMENT

(75) Inventors: Gautam Pardhy, Colorado Springs, CO (US); James L. Howze, Jr., Colorado Springs, CO (US); Theodore R. Keller, Jr., Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 3708 days.

(21) Appl. No.: 09/970,495

(22) Filed: Oct. 3, 2001

(65) Prior Publication Data

US 2003/0065767 A1    Apr. 3, 2003

(51) Int. Cl.
*G06F 15/173*   (2006.01)
(52) U.S. Cl.
USPC .......................................... 709/224; 709/229
(58) Field of Classification Search
USPC .......................................... 709/224, 203, 229
See application file for complete search history.

(56) References Cited

U.S. PATENT DOCUMENTS

| | | | | |
|---|---|---|---|---|
| 5,724,510 A * | 3/1998 | Arndt et al. | ................... | 709/220 |
| 6,023,507 A * | 2/2000 | Wookey | ........................ | 709/224 |
| 6,085,244 A * | 7/2000 | Wookey | ........................ | 709/224 |
| 6,128,658 A * | 10/2000 | McLean | ........................ | 709/224 |
| 6,405,262 B1 * | 6/2002 | Vogel et al. | ................... | 719/315 |
| 6,750,879 B2 * | 6/2004 | Sandberg | ...................... | 715/714 |

* cited by examiner

*Primary Examiner* — El Hadji Sall
(74) *Attorney, Agent, or Firm* — Edwards Wildman Palmer LLP; Scott D. Wofsy; Christopher J. Capelli

(57) ABSTRACT

A method of testing connectivity of networks includes pinging multiple devices on the network upon a single command. The devices to be pinged are pre-arranged in one or more catalogs (lists) and stored in the memory of a connectivity test instrument. A ping catalog is selected, and each device in the list automatically is pinged three times from a single ping command. Data from the network devices is parsed, stored and formatted for display to a user.

17 Claims, 3 Drawing Sheets

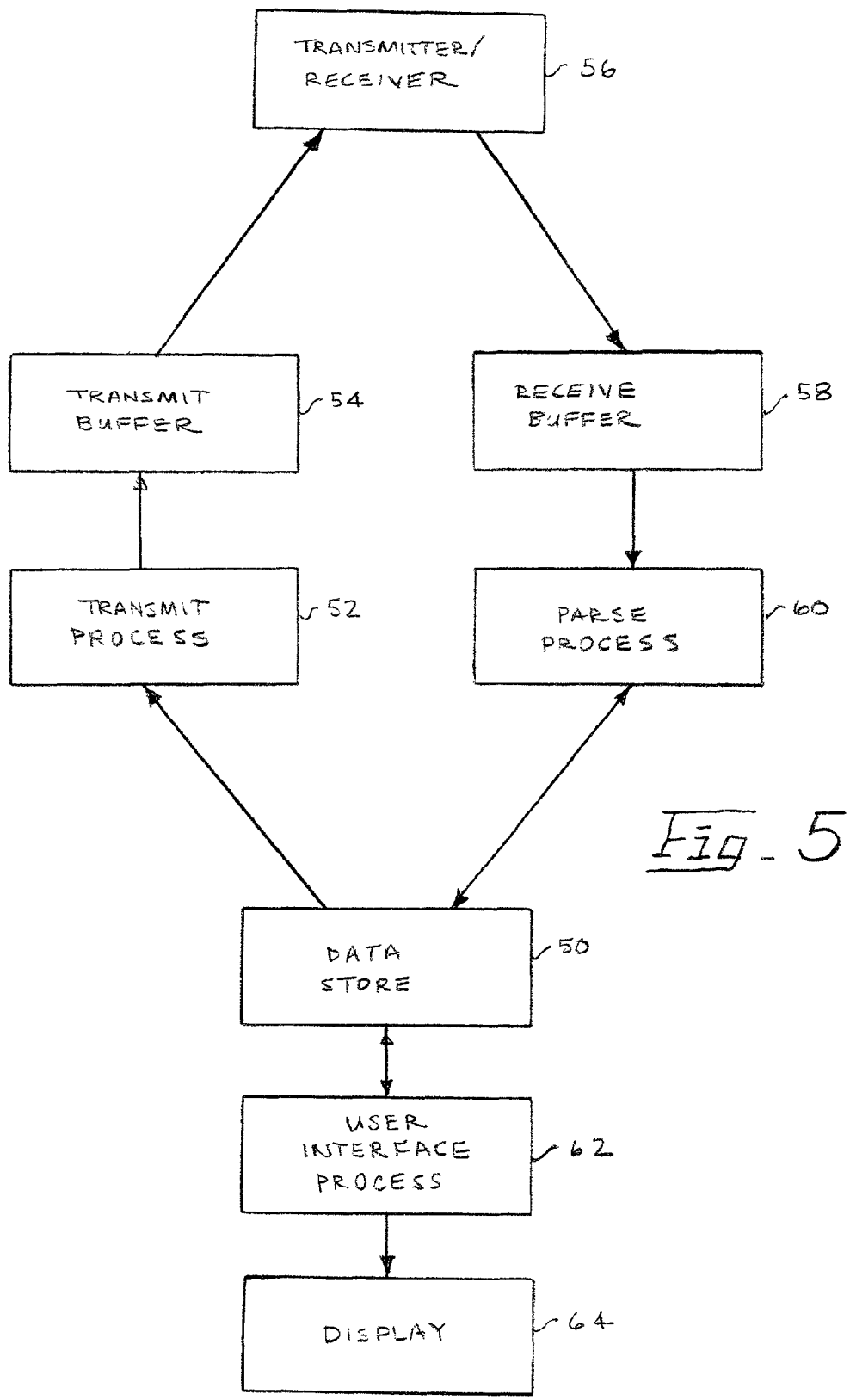

MULTIPLE PING MANAGEMENT

BACKGROUND OF THE INVENTION

This invention relates generally to network testing, and in particular to testing connectivity of networks by automatically pinging multiple devices.

More than twenty years ago when the internet was in its infancy, standard committees were formed to ensure that devices could communicate over a network irrespective of the particular hardware used. Standards for ensuring reliable full-duplex transmission of data from one machine to another included the Transmission Control Protocol (TCP) and Internet Protocol (IP), which were merged into the TCP/IP Internet Protocol Suite, and are referred to today as simply the TCP/IP protocols. An important aspect of these protocols is the Internet Control Message Protocol (ICMP), which handles error and control messages.

Network test and diagnostic equipment employs the TCP/IP protocols in helping network managers and technicians using the equipment to identify network problems. The ICMP includes, among other things, a feature that is called an echo request-and-reply (referred to as "ping") that is used to test whether a particular destination can be reached and will respond.

There are currently network connectivity test instruments in the market that connect to a network to verify that a network has been installed properly or that all of the devices on the network interoperate as they are intended. Such a connective test instrument is manufactured and sold by Fluke Networks, Inc. This connectivity test instrument is capable of connecting both to a desktop personal computer (PC) and to a network. Its capabilities include service identification (such as Telco, token ring, or ethernet), testing cables, generating wire maps, verifying PC and network link configurations, identifying services (servers, printers, routers, etc.), and generating problems logs to aid the user in troubleshooting network problems. It also uses the ICMP protocol discussed above to test whether a particular destination can be reached and will respond. However, it tests network connectivity by sending ICMP echo requests to one destination at a time, and waiting until responses are received and processed before sending an ICMP echo request to another destination. For verification of connectivity of several devices on a given network, the network technician or installer must laboriously ping each device one at a time, which is a time-consuming process.

It would be desirable to incorporate a feature into a network connectivity test instrument that would allow it to ping several devices upon a single ping command, with results quickly tabulated and displayed.

SUMMARY OF THE INVENTION

In accordance with the present invention, an apparatus and method for testing connectivity of networks includes automatically pinging multiple devices upon a single ping command.

The devices to be pinged are pre-arranged in one or more catalogs (lists) and stored in the memory of a connectivity test instrument. The user may manually enter a ping catalog into the instrument's memory, or pre-arranged lists may be downloaded from a PC or the like. Not all of the devices on a given network need to be included in the ping catalog, allowing the user to determine what devices are sufficiently important to include in the catalog. Moreover, the IP addresses listed in the ping catalog can be on one or many networks.

In operation, a ping catalog is selected, and, upon a single ping command, each device in the list automatically is pinged three times from a single ping command. Data from the network devices is parsed, stored and formatted for display to a user.

It is therefore one important aspect of the present invention to identify several devices on a network and verify connectivity quickly and automatically.

Other objects, features, and advantages of the present invention will become obvious to those having ordinary skill in the art upon a reading of the following description when taken in conjunction with the accompanying drawings.

BRIEF DESCRIPTION OF THE DRAWINGS

FIG. 5 is a data flow diagram to explain the functionality of a connectivity test instrument in accordance with the present invention;

DETAILED DESCRIPTION OF THE INVENTION

Figure 1:
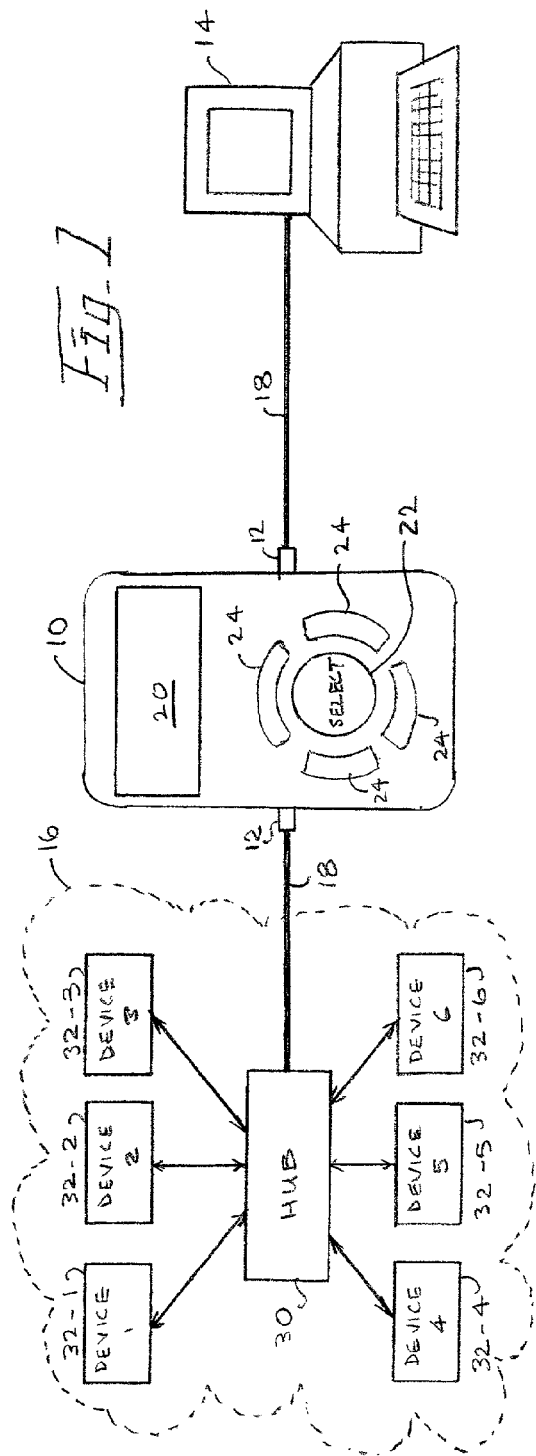
FIG. 1 is a diagram of a connectivity test instrument in accordance with the present invention connected in a typical test setup.

Referring to FIG. 1 of the drawings, there is shown a connectivity test instrument 10 in accordance with the present invention connected in a typical test setup. Test instrument 10 may suitably include one or more input connectors 12 which allow connection to a personal computer (PC) 14 and to a network 16 via standard cables 18. The test instrument 10 may be connected to either PC 14 or network 16 in a single-ended mode, or to both simultaneously in an in-line mode. Test instrument 10 includes a user interface comprising a display device 20, a select button 22, and navigation buttons 24. In operation, icons and menu text items are displayed on the screen of the display device 20, which suitably may be a liquid crystal display (LCD) device. The navigation buttons 24 permit a user to move a cursor or highlighted area around on the screen to select an item. Pushing the select button 22 then activates the selection, which may, by way of example, produce another menu screen or activate a test program.

While connecting to network 16 may be as simple as connecting instrument 10 to a wall plug, for purposes of understanding the invention, network 16 is exemplified by a hub 30 and its associated devices 32-1 through 32-6, which in turn suitably may be devices such as PCs and printers.

In accordance with the present invention, connectivity test instrument 10 includes a ping "catalog" feature. The catalogs are predetermined lists of devices known to exist on specific networks known to an instrument user. That is, the user of instrument 10 may create one or more such catalogs, which are then stored within instrument 10. To test connectivity of multiple devices on a network, a catalog comprising a list of a plurality of network devices may be selected by the instrument user, and all of the devices in the catalog are pinged automatically. Instrument 10 reports the status of the ping operation to the user as well as detailed data on the results of ping operations for each device on a given network.

Figure 2:
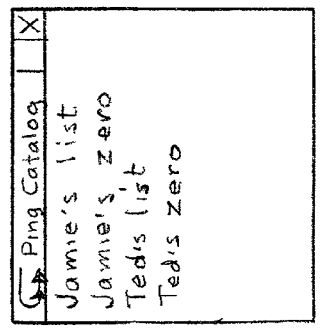

FIG. 2 is an example of a display screen showing a plurality of specific ping catalogs that have been individually created based on knowledge of devices on specific networks and stored within instrument 10. The catalogs may be custom created by the instrument user, or may be downloaded from a PC. The navigation buttons 24 are used to highlight the desired the catalog. When select button 22 is pressed, the desired catalog is selected and a command given to execute a ping operation.

The ping operation is carried out by verifying a path to reach each of the devices in the catalog, and then each device is pinged asynchronously by sending an echo request to each device and waiting for replies. Each device in the catalog is pinged three times and the results of the entire ping operation are displayed to the user in a form using icons to indicate the status. Details are available if the user wishes to view them.

Figure 3:
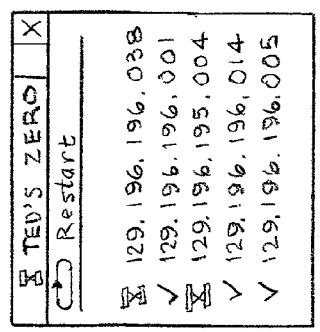

FIG. 3 is an example of a display screen showing an active ping catalog. Note that the name of the catalog is shown, along with a list of device Internet Protocol (IP) addresses. For each device in the catalog, an icon showing the test status is shown. An hourglass icon represents that the ping operation is still running, while a check mark indicates that the ping operation has been completed. Additionally, exclamation points are used to indicate that the ping operation is complete with errors, wherein the number of exclamation points is equal to the number of packets (echo requests) lost, up to three exclamation points indicating that all of the echo requests have been lost. By highlighting any of the displayed IP address, details of the selected ping operation may be viewed.

Figure 4:
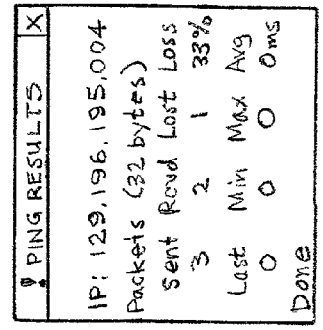
FIGS. 2-4 are a series of tester display showing respectively a list of ping catalogs, an active ping catalog, and ping results.

FIG. 4 is an example of a display screen showing detailed results of the ping operation performed on a specific device, as well as the status of the ping operation (done). In the example shown, one exclamation point notifies the user that one packet or echo request has been lost. As can be discerned, each device in the ping catalog may be managed independently, thus allowing connectivity instrument 10 to ping a next device on the list without completing the entire ping cycle on the previous device. In one embodiment of the present invention, a ping cycle comprises pinging each device three times before going to the next device on the list.

FIG. 5 is a data flow diagram to explain the functionality of connectivity test instrument 10. It can be appreciated that the instrument operates under the control of a microprocessor or the like.

Data Store 50 is the instrument's memory. It contains all the instrument configuration and test data, including data that is returned from a network under test and parsed from ping replies. A plurality of ping catalogs may be stored in Data Store 50. Instrument configuration data includes the connectivity test instrument's Media Access Control (MAC) address, its IP address, a subnet mask, and a default router. These elements are used by all network devices, and are well known to those skilled in the art. The instrument MAC address is a unique hardware level address assigned at the factory. It is used to determine whether or not a received packet is for the instrument (for example, as a result of transmit operation from the instrument). The instrument's IP address is either acquired via Dynamic Host Configuration Protocol (DHCP) or entered manually by the user. The instrument's IP address is used in the transmit data packets as the instrument IP address. Target devices on the network use this address to reply to ping operations.

Data parsed and collected during a ping operation include the instrument MAC and IP addresses as discussed above, network device MAC and IP addresses, transmit and receive timestamps, and transmit and receive packet counts.

The network device MAC address is acquired via Address Resolution Protocol (ARP) and is used in the transmit data packet. The device MAC address is also used to check which device is replying in a specific receive data packet.

The device IP address is entered into a ping catalog for each device that the user pings. It is used to acquire a MAC address for the target device and also to check which device is replying in a specific receive data packet.

The transmit timestamp is data provided by the transmit hardware, and saved in the Data Store 50 for each transmit data packet. It is used to perform time calculations when data packets are received from the target device.

The receive timestamp is data assigned by the receive hardware to each receive data packet. It is used to perform time calculations so that time statistics may be displayed to the user. Time statistics are common to many pings on many different platforms.

The transmit packet count is used to keep track of the number of packets that have been sent to a target device. This data is displayed as part of the detail status for a ping operation. Refer again to FIG. 4.

The receive packet count is used to keep track of the number of packets that have been received from a target device. This data is also displayed as part of the detail status for a ping operation.

In Transmit Process 52, data by which the instrument will perform a transmit operation is extracted from Data Store 50 under the control of a state machine and inserted into appropriate locations in a data packet residing in Transmit Buffer 54 to determine the operations that need to be performed during a ping operation. This operation will be explained further in connection with FIG. 6.

Transmit Buffer 54 holds data packets until a transmit command is given, at which time the data packets are transmitted. It should be noted that in instrument 10, the transmit command is initiated by pressing select switch 22, and then data packets for each ping are assembled and transmitted under the control of the above-mentioned state machine.

Transmitter/Receiver 56 physically transmits data via connector 12 to a PC 14 or a network 16 such as is shown in FIG. 1, and receives responses in the form of received data packets.

Receive Buffer 58 holds the received data packets until Parse Process 60 is ready to process them.

Parse Process 60 parses the received data packets and extracts data pertinent to the instrument. Data from Data Store 50 is used to determine whether the packet is a reply to a transmit operation. The parsed data is then stored in Data Store 50. This process will be explained in connection with FIG. 7.

User Interface Process 62 permits data from Data Store 50 to be retrieved for display, and also allows the user to enter instrument configuration information.

Display 64 is where information is displayed, and is virtually identical to display device 20 of FIG. 1.

Figure 6:
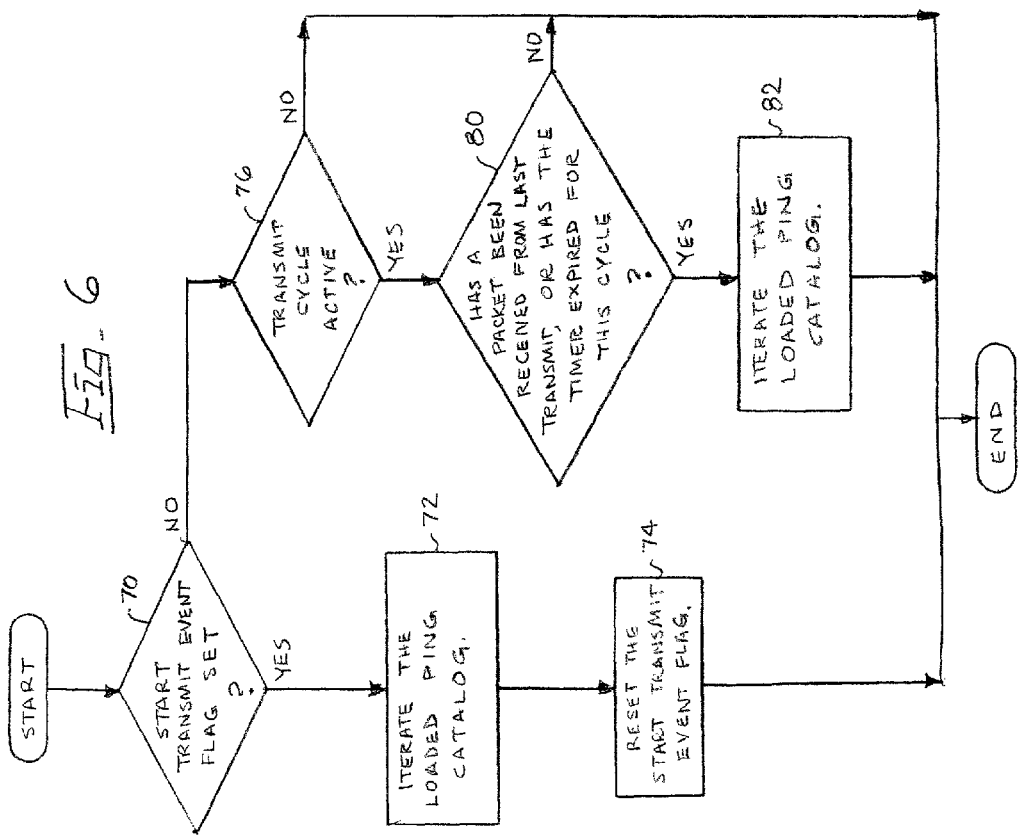
FIG. 6 is a flow chart of the ping operation transmit process.

FIG. 6 is a flow chart of the ping operation transmit process. Even though a catalog comprises a plurality of network devices, each device is managed independently. Accordingly, the process described herein relates to pinging a single network device.

In block 70, the state machine checks the status of the start transmit event flag to see if a transmit operation has been initiated. If the flag is set, the transmit process begins.

In block 72, the ping catalog is loaded from Data Store 50 and transmitted iteratively until all the packets have been transmitted. For each device listed in the catalog, a MAC address is acquired, an echo request message is sent, the packet transmit is incremented, and a transmit timestamp is stored.

In block 74, the start transmit event flag is reset after all the packets have been transmitted.

If the flag is not set in block 70, the state machine checks in block 76 to determine whether a transmit cycle is active. If a transmit cycle is active, then in block 80 the state machine checks to see whether a packet has been received from the last transmit, or whether a timer for this active transmit cycle has expired.

If either a packet has been received from the last transmit, or the timer for this active transmit cycle has expired, then in block 82 the loaded ping catalog is iterated. For each device for which the ping operation has not been completed (three messages sent), an echo request message is sent, the packet transmit is incremented, and a transmit timestamp is stored.

Figure 7:
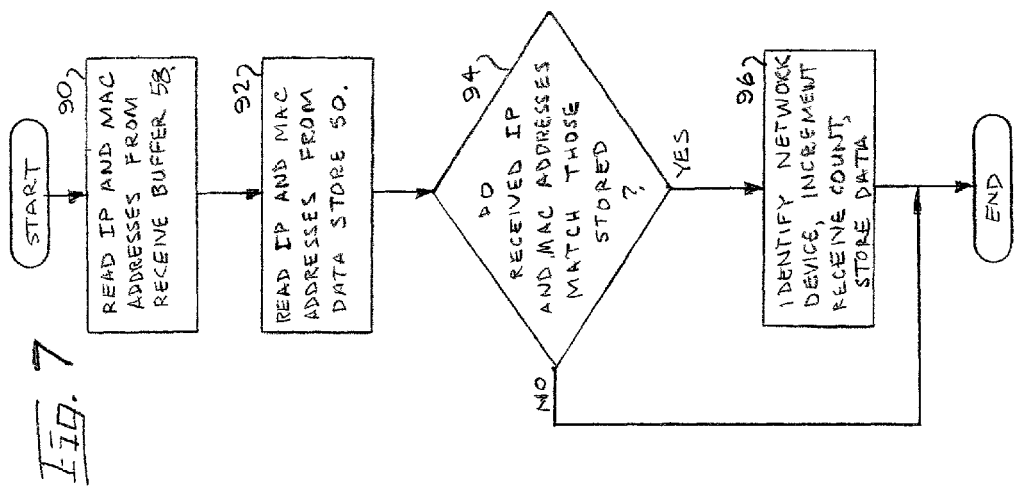
FIG. 7 is a flow chart of the ping operation parse process.

FIG. 7 is a flow chart of the ping operation parse process. As mentioned above, each network device is managed independently, and therefore this process is carried out for data received from each network device. First, in block 90, the IP and MAC addresses are read from the data in the receive buffer 58. Next, in block 92, the IP and MAC addresses are read from the Data Store 50. Then, in block 94, a check is made to see if the IP and MAC addresses match in order to verify whether the received data packet is for the instrument 10.

Once it is verified that the received data packet is for the instrument 10, in block 96 the IP address from the received data packet is used to identify the network device stored in Data Store 50. The receive count is incremented for this particular network device, and a receive timestamp is stored with the data packet.

From the foregoing it can be seen that connectivity test instrument 10 may store one or more ping catalogs, which in turn are lists of a plurality of network devices. In a proposed commercial embodiment, there is sufficient memory to store up to ten ping catalogs of ten network devices each. However, this should not be construed to be a limitation. A ping catalog is selected, and each device in the list automatically is pinged three times from a single ping command. Data from the network devices is parsed, stored and formatted for display to a user.

While we have shown and described the preferred embodiment of our invention, it will be apparent to those skilled in the art that many changes and modifications may be made without departing from our invention in its broader aspects. It is therefore contemplated that the appended claims will cover all such changes and modifications as fall within the true scope of the invention.

What we claim as our invention is:

1. A method of testing connectivity of networks, comprising the steps of:
    (a) storing within a connectivity test instrument one or more ping catalogs, each ping catalog defining a plurality of predetermined network devices on at least one specific network;
    (b) automatically pinging, with more than one echo message, each of said plurality of predetermined network devices in a selected ping catalog upon a single command to said test instrument;
    (c) receiving data packets that may return from each of said plurality of predetermined network devices, said data packets containing status and ping results of each predetermined network device wherein a MAC address is acquired for each device returning a data packet whereby a packet transmit is incremented and stored; and
    (d) displaying the status and ping results of each predetermined network device.

2. A method in accordance with claim 1 wherein said ping of each of said plurality or predetermined network devices comprises sending three echo message to each device.

3. A method in accordance with claim 1 wherein said pinging of devices in the selected ping catalog is performed in an iterative manner.

4. A method in accordance with claim 1 wherein at least one of said one or more ping catalogs are custom created by a user.

5. A method in accordance with claim 1 wherein at least one of said one or more ping catalogs are downloaded from a PC.

6. A method in accordance with claim 1 wherein one of said ping catalogs are downloaded.

7. A method in accordance with claim 1 wherein said displaying status comprises displaying one of a representation that a test is still running or that a test has been completed.

8. A method in accordance with claim 7 wherein said displaying that a test has been completed comprises optionally indicating an error status.

9. A method in accordance with claim 8, wherein indicating an error status comprises displaying a representation indicating a number of errors that have occurred.

10. A method of testing connectivity of networks, comprising the steps of:
    (a) storing within a connectivity test instrument plural ping catalogs, each ping catalog defining a plurality of predetermined network devices on at least one specific network;
    (b) selecting one of said plural ping catalogs;
    (c) automatically pinging, with more than one echo message, each of said plurality of predetermined network devices in said selected ping catalog upon a single command to said test instrument;
    (d) receiving data packets that may return from each of said plurality of predetermined network devices, said data packets containing status and ping results of each predetermined network device wherein a MAC address is acquired for each device returning a data packet whereby a packet transmit is incremented and stored; and
    (e) displaying the status and ping results of each predetermined network device.

11. A method in accordance with claim 10 wherein said ping of each of said plurality of predetermined network devices comprises sending three echo messages to each device.

12. A method in accordance with claim 10 wherein said pinging of devices in the selected ping catalog is performed in an iterative manner.

13. A method in accordance with claim 10 wherein one of said ping catalogs are custom created by a user.

14. A method in accordance with claim 10 wherein one of said ping catalogs are downloaded.

15. A method in accordance with claim 10 wherein said displaying status comprises displaying one of a representation that a test is still running or that a test has been completed.

16. A method in accordance with claim 15 wherein said displaying that a test has been completed comprises optionally indicating an error status.

17. A method in accordance with claim 16, wherein indicating an error status comprises displaying a representation indicating a number of errors that have occurred.

* * * * *